United States Patent [19]

Paulson

[11] Patent Number: 4,876,080
[45] Date of Patent: Oct. 24, 1989

[54] HYDROGEN PRODUCTION WITH COAL USING A PULVERIZATION DEVICE

[75] Inventor: Leland E. Paulson, Morgantown, W. Va.

[73] Assignee: The United States of Americal as represented by the United States Department of Energy, Washington, D.C.

[21] Appl. No.: 175,659

[22] Filed: Mar. 29, 1988

Related U.S. Application Data

[63] Continuation of Ser. No. 941,130, Dec. 12, 1986, abandoned.

[51] Int. Cl.$^4$ ................................................ C01B 1/02
[52] U.S. Cl. .................................. 423/648.1; 252/373; 423/437
[58] Field of Search .............. 252/373; 423/437, 648.1

[56] References Cited

U.S. PATENT DOCUMENTS 1,984,380 12/1934 Odell .................................... 252/373
2,554,263 5/1951 Nelson ................................. 252/373
2,641,450 6/1953 Garbo .................................. 252/373
3,304,249 2/1967 Katz ............................. 423/DIG. 16
4,219,164 8/1980 Taylor ..................................... 241/5
4,392,981 7/1983 Corbeels et al. ..................... 252/373

OTHER PUBLICATIONS

Max Leva, *Fluidization*, McGraw-Hill Book Company, Inc., (1959), pp. 6, 7.

Primary Examiner—John Doll
Assistant Examiner—Wayne A. Langel
Attorney, Agent, or Firm—Earl L. Larcher; Stephen D. Hamel; Judson R. Hightower

[57] ABSTRACT

A method for producing hydrogen from coal is described wherein high temperature steam is brought into contact with coal in a pulverizer or fluid energy mill for effecting a steam-carbon reaction to provide for the generation of gaseous hydrogen. The high temperature steam is utilized to drive the coal particles into violent particle-to-particle contact for comminuting the particulates and thereby increasing the surface area of the coal particles for enhancing the productivity of the hydrogen.

7 Claims, 1 Drawing Sheet

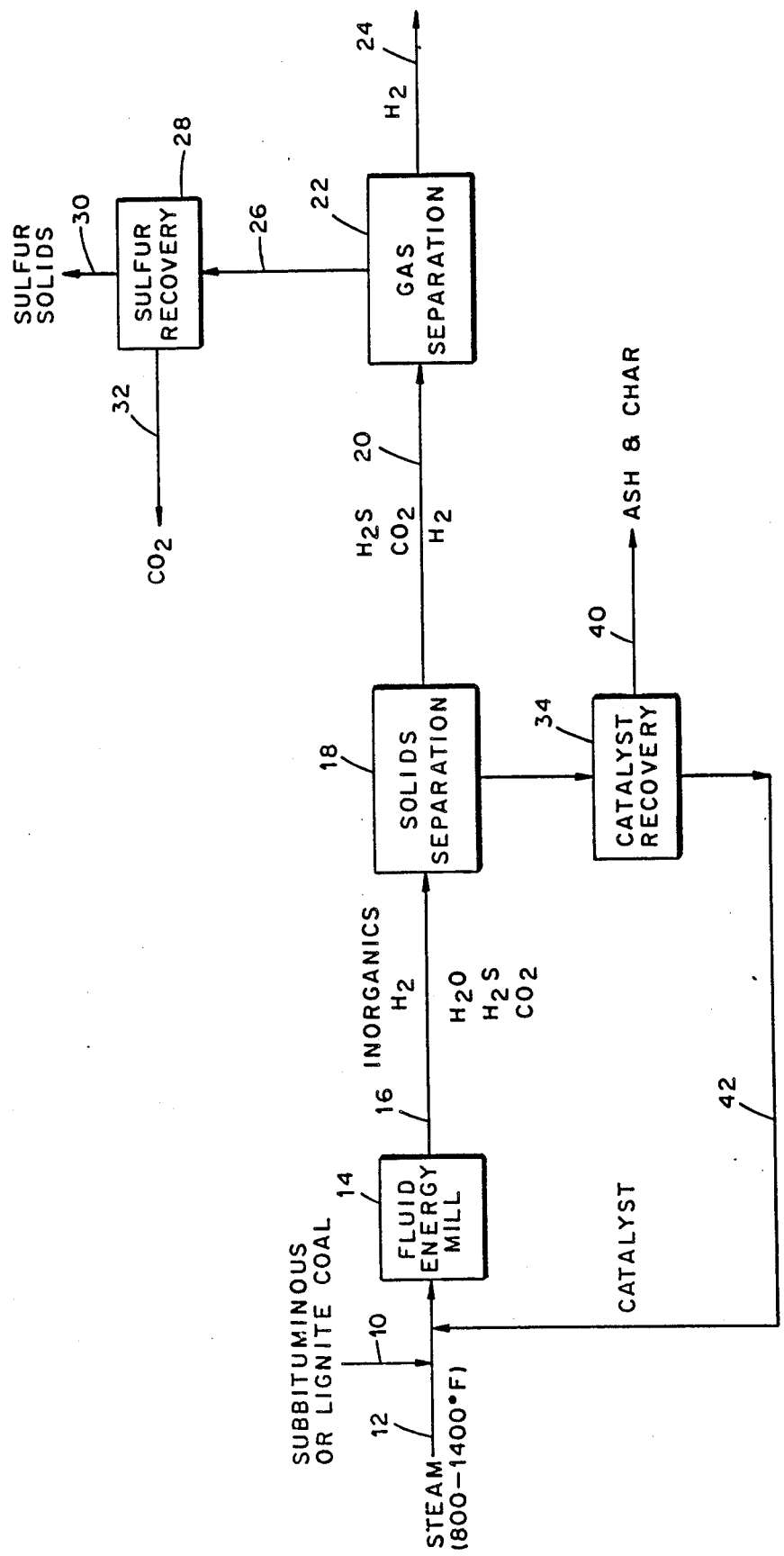

HYDROGEN PRODUCTION WITH COAL USING A PULVERIZATION DEVICE

This is continuation of application Ser. No. 941,130 filed Dec. 12, 1986 now abandoned.

BACKGROUND OF THE INVENTION

The present invention relates generally to the production of gaseous hydrogen with carbonous materials in the presence of steam by the steam-carbon reaction, and more particularly to such generation of hydrogen by rapidly comminuting coal in the presence of high-temperature steam.

Gaseous hydrogen is becoming of increasing interest as a fuel, as feed stock in the production of various chemicals and propellents, and for use in coal liquefaction reactions. The production of hydrogen can be accomplished by employing several different techniques such as by the disassociation of water, reforming of methane, and by practicing the well known steam-carbon reaction where in the presence of relatively high temperatures carbon and steam react to produce carbon dioxide and gaseous hydrogen. The practice of the steam-carbon reaction is particularly successful with low rank coal such as lignite or subbituminous coal due to the greater inherent reactivity of these low rank coals. Further, lignite or subbituminous coal have higher concentrations of active sites, higher porosity, and a more uniform distribution of alkaline impurities which act as a catalyst. These coals when contacted with steam produce hydrogen with the greater concentration of hydrogen occurring with higher steam temperatures.

SUMMARY OF THE INVENTION

In prior practices, the coal was ground to a selected particle size and subsequently introduced into a reactor for contact with the steam to produce the hydrogen by the steam-carbon reaction. The present invention provides for a significant increase in the production of hydrogen over that previously achievable. In accordance with the present invention, the coal particulates in the presence of steam are rapidly ground or comminuted to very small particle sizes to significantly increase the surface area and reaction sites on the coal for enhancing the carbon-steam reaction. Generally, the method of the present invention for producing steam is achieved by the steps of subjecting the coal particulates to a turbulent particle-to-particle count while imparting a sufficient velocity to the coal particles to effect the comminution thereof upon such contact. These coal particles are contacted during the comminution thereof with steam at a temperature in a range of about 800° F. to about 1400° F. to effect the steam-carbon reaction for generating gaseous products formed primarily of hydrogen and carbon dioxide. The production of hydrogen increases with increasing temperatures.

An advantage of the subject method of producing hydrogen with coal, is that the previously required oxygen plant is eliminated. Also, since the product gas contains a high quantity of hydrogen, the concentration of hydrogen in the product gas is substantially simplified. The comminution device is operated under conditions to maximize carbon dioxide production so that the shift requirements of the product stream are significantly reduced or even eliminated.

Other and further objectives of the present invention will be obvious upon an understanding of the illustrative embodiment and method about to be described, or will be indicated in the appended claims; and various advantages not referred to herein will occur to one skilled in the art, upon employment of the invention and practices.

DESCRIPTION OF THE DRAWING

The FIGURE is a schematic flow chart illustrating the steps of the method of the present invention wherein coal during comminution reacts with steam to generate gaseous hydrogen.

The flow chart has been chosen for the purpose of illustration and description of the invention and is not intended to be exhaustive or to limit the invention to the precise arrangement shown. This flow chart is chosen and described in order to best explain the principals of the invention and their application and particular use to thereby enable others skilled in the art to use the invention in various embodiments and modifications as are best adapted to the particular use contemplated.

DETAILED DESCRIPTION OF THE INVENTION

As generally described above, the present invention is directed to a method for production of a gaseous hydrogen from low rank coals in the presence of steam while comminuting the coal to ultra-fine particle size for increasing the surface area of the coal and providing fresh reaction sites on the coal particles in a manner not heretofore practiced.

With reference to the accompanying drawing, coal of a relatively low rank such as subbituminous or lignite either "as mixed" or if need be after being dried in an inert atmosphere is ground to a particulate size in the range of about 0.75 to 0.25 inch. These coal particulates are conveyed through a conduit 10 into a suitable mixing chamber (not shown) where steam through conduit 12 contacts the coal and is utilized to convey the coal particulates into a fluid energy mill generally shown at 14. In the fluid energy mill, the coal particulates are driven by the steam in a highly turbulent manner to provide significant particle-to-particle contact for fracturing or comminuting the coal particles into smaller fractions for significantly increasing the surface area of the coal particles while exposing fresh reaction sites at each fracture. These surface sites containing carbon are contacted by the hot steam and, essentially, instantly react therewith for producing reaction gases formed primarily of carbon dioxide and hydrogen by the steam-carbon reaction. Hydrogen sulfide may be produced if the coal contains much sulfur.

The fluid energy mill 14 utilized for the practice of the present invention may be of any suitable type which can efficiently and rapidly break up the coal particles from a size less than about 0.25 inch to a size less than about 10 micrometers so as to provide the significant increase in surface area required for efficient hydrogen production as described herein. For example, one type fluid energy mill believed to be satisfactory for the practice of the present invention is described in U.S. Pat. No. 4,219,164 which issued Aug. 26, 1980, in the name of David W. Taylor, and is entitled "Comminution of Pulverulent Material by Fluid Energy." Generally, the fluid energy mill described in this patent provides for the high-turbulent mixing of particulate material by a particulate driving medium such as air or steam in a centrally located grinding zone within a confining vessel. The steam and particulate material are injected into the grinding zone to create a central, vertically flowing vortex which causes rapid and turbulent particle-to-particle contact for comminuting the particulate material. The fluid energy mill of this patent confines the grinding zone to the central portion of the vessel so as to minimize erosive contact of the particulate material against the walls of the vessel.

The reaction for producing the hydrogen is the well known steam-carbon reaction:

$$C + H_2O \rightarrow CO_2 + H_2$$

This reaction at near atmospheric pressure provides for the production of the hydrogen by the reaction of the steam with the carbon in the particulate material while within the fluid energy mill. The steam provides the drive mechanism for effecting the rapid turbulent mixing and comminution of the particulates and as well as the high temperature steam for effecting the reaction steam-carbon reaction. The steam is at a temperature in the range of about 800° to about 1400° F. Steam temperatures less than about 800° F. are not considered to be cost-effective in that the quantity of hydrogen produced is excessively low. The preferred temperature of the steam utilized in practice of the invention is in the range of about 1200° to 1400° F. The high temperature steam is used to convey the coal into the fluid energy mill. The pressure of the steam in the range of about 800° to 1400° F. is in the range of about 200 to 1000 psi. This high pressure steam is conveyed into the fluid energy mill through suitable openings or nozzles and the pressure of the steam drops rapidly to atmospheric to impart a significant driving force to the particles carried thereby for imparting the rapid turbulent mixing and comminution of the particulate material. The reaction of the process claim method is practiced at or near atmospheric pressure so that in addition to providing the best thermodynamic conditions for the steam-carbon reaction, the driving force provided by the steam can be fully realized as well as providing for the economical construction of the fluid energy mill and other associated equipment.

The energy to drive the endothermic steam-carbon reaction is provided by the high temperature of the steam, plus the heat generated during the pulverization due to gross inefficiencies of the system.

It is expected that about 60 to 63 percent of the gas produced by the practice of the present invention with the steam in the preferred temperature ranges is in the form of hydrogen so as to render the process highly cost-effective and an efficient hydrogen producer.

The rapid comminution of the coal particulates within the fluid energy mill provides for the substantial increase of surface area due to the fragmentation as well as the the exposure of fresh carbon-bearing surfaces which have not been previously exposed to environmental contaminants. The newly created and enlarged surface area provides for significant contact between the steam and the carbon in the coal particulates to effect the high productivity achieved by the present invention. The particulate material and the steam remain within the fluid energy mill for durations sufficient to effect the comminution of the particulates to a fraction size less than about 15 micrometers and then the reaction products, excess steam and spent solid particulate material are discharged through conduit 16 into a gas-solid separation mechanism such as a cyclone generally shown at 18. The gaseous products discharged from the fluid energy mill include hydrogen, hydrogen sulfide, and carbon dioxide, while the solids include inorganic particulate materials such as ash and char produced by the conversion reaction and possibly mild gasification liquids and tars. The gases and water (steam) after the solids separation are conveyed through line 20 into a conventional gas separator 22 where the gaseous hydrogen is separated from the hydrogen sulfide and carbon dioxide. This separation may be readily achieved by employing a basic separator such as methanol or other solvent which selectively absorbs carbon dioxide and hydrogen sulfide leaving a hydrogen rich gas stream. The hydrogen from the separator is then conveyed through line 24 to a suitable point of use such as a coal liquefaction system, a combustion system, a fuel cell or a chemical production plant. The other gases separated from the hydrogen in the gas separator such as the carbon dioxide and hydrogen sulfide are conveyed through line 26 into a suitable sulfur recovery vessel 28 where the sulfur is separated by conventional techniques and removed through line 30 while the carbon dioxide is discharged through line 32.

The activity of the present invention provides for a significant production of hydrogen due to increased surface area and the exposure of the fresh carbon reaction sites on the coal particles. Also, alkaline impurities are exposed on the surface sites of the coal particles to provide catalytic activity for enhancing the reaction. Other catalysts may also be added to the reaction along with the coal. For example, a catalyst such as potassium carbonate, sodium carbonate or any other suitable alkali metal carbonate may be added to the fluid energy mill with the coal to accelerate the reaction. Normally a concentration of catalyst of about 0.1 to 10 weight percent is sufficient for this purpose. The catalytic material may be recovered for recycling by separating the catalyst along with the other solids in the solid separation device 18. If recovered, the catalyst may be recycled through line 42 to the fluid energy mill for facilitating the production of hydrogen with coal.

By employing the high temperature steam in the fluid energy mill during the comminution of the particulate material there is an instantaneous heat transfer from the steam to the small, freshly ground coal particulates during the highly turbulent coal-steam mixing provided by the coal-pulverizing action of the fluid energy mill. Another advantage obtained by using the fluid energy mill is that any stagnation or boundary layers occurring at the coal surfaces are effectively minimized or removed during the turbulent mixing in the vessel so as to further increase the steam-carbon reaction rate for enhancing the productivity of the hydrogen. Another advantage derived from the present invention is that the process temperature utilized in the reaction is less than the melting temperature of the ash derived from the reaction so as to permit the ready separation of solids from gaseous reaction products.

I claim:

1. A method for producing hydrogen from coal by the steps consisting essentially of contacting coal particulates having a particulate size in the range of about 0.75 to 0.25 inch with steam at a temperature in the range of about 800° to 1400° F. for subjecting the coal particulates to turbulent particle-to-particle contact while imparting sufficient velocity to the coal particulates to effect comminution thereof into smaller fractions of a maximum size of about 15 micrometers for significantly increasing the surface area of the coal by said particle-to-particle contact, and contacting the coal particles during the comminution thereof with the steam at a temperature in said range of about 800° to about 1400° F. to effect an endothermic steam-carbon reaction for generating gaseous hydrogen.

2. A method for producing hydrogen from coal as claimed in claim 1, including the step of mixing the steam and the coal particulates prior to subjecting the coal particulates to the turbulent particle-to-particle contact, wherein the steam is at a pressure greater than about 200 psi, and wherein the steam-coal mixture is introduced into a vessel at essentially atmospheric pressure to provide a pressure drop in the steam for driving the coal particulates into the comminuting particle-to-particle contact.

3. The method for producing hydrogen from coal as claimed in claim 2, wherein the steam is at a pressure in the range of about 200 to 1000 psi.

4. The method for producing hydrogen from coal as claimed in claim 1 wherein the temperature of the steam is in the range of about 1200° to 1400° F., and wherein the gaseous hydrogen generated forms greater than about 60 percent of the gases produced by the steam-carbon reaction.

5. The method for producing hydrogen as claimed in claim 1 wherein the energy for effecting said endothermic reaction is provided by the heat in the steam and in the communition of the coal.

6. The method for producing hydrogen from coal as claimed in claim 1, including the step of contacting the coal particulates during the steam-carbon reaction with a catalyst in an effective amount for enhancing the steam-carbon reaction.

7. The method for producing hydrogen as claimed in claim 5, wherein the catalyst is an alkai metal carbonate in a concentration of about 0.1 to 10 weight percent of the coal.

* * * * *